United States Patent [19]
Dorall

[11] 3,953,551
[45] Apr. 27, 1976

[54] AIR COOLING APPARATUS

[76] Inventor: Arthur G. Dorall, Skyridge, Star Rte. No. 3, Pioneer, Calif. 95666

[22] Filed: Jan. 22, 1973

[21] Appl. No.: 325,297

[52] U.S. Cl. .............................. 261/91; 261/DIG. 4
[51] Int. Cl.$^2$ .......................................... B01F 3/04
[58] Field of Search .................. 261/91, 97, DIG. 4, 261/DIG. 15; 55/486, 487

[56] References Cited
UNITED STATES PATENTS

| | | | |
|---|---|---|---|
| 2,078,202 | 4/1937 | Manning | 261/91 |
| 2,122,334 | 6/1938 | Asbury | 261/91 X |
| 2,157,416 | 5/1939 | Kjos | 261/91 X |
| 2,752,134 | 6/1956 | Paulus | 261/97 X |
| 2,998,714 | 9/1961 | Bonzer | 261/DIG. 4 |
| 3,220,707 | 11/1965 | Weatherston et al. | 261/91 X |
| 3,283,478 | 11/1966 | Katzman et al. | 261/91 X |
| 3,290,021 | 12/1966 | Blachly et al. | 261/91 X |
| 3,294,376 | 12/1966 | Eranosian | 261/91 X |
| 3,348,821 | 10/1967 | Martin et al. | 261/DIG. 15 |
| 3,443,366 | 5/1969 | Schwab | 55/487 X |
| 3,527,027 | 9/1970 | Knight et al. | 55/487 X |
| 3,552,097 | 1/1971 | Grasseler | 261/DIG. 4 |

*Primary Examiner*—Tim R. Miles
*Assistant Examiner*—Richard L. Chiesa
*Attorney, Agent, or Firm*—Townsend and Townsend

[57] ABSTRACT

An improved air cooler for use on trailers, campers and the like wherein the cooler has a water supply tank covered by a baffle having a generally horizontal upper surface provided with rib means defining a depression for receiving the lower, continuous margin of a filter. The baffle has holes in the depression to allow water gravitating from the filter to pass through the baffle and return to the tank. Air is driven through the filter by a motor-operated fan coupled to a conical pump extending through a central opening in the baffle defined by a flange having means thereon to prevent water surges in the opening. Water in the tank is elevated by the pump and projected into the airstream flowing toward and into the filter. The air inlet to the housing has a lower boundary which slopes away from the fan to allow moisture to gravitate away from the fan when the cooler is not in use.

This invention relates to improvements in air coolers of the evaporative type used on the roof of a trailer, camper and the like.

3 Claims, 4 Drawing Figures

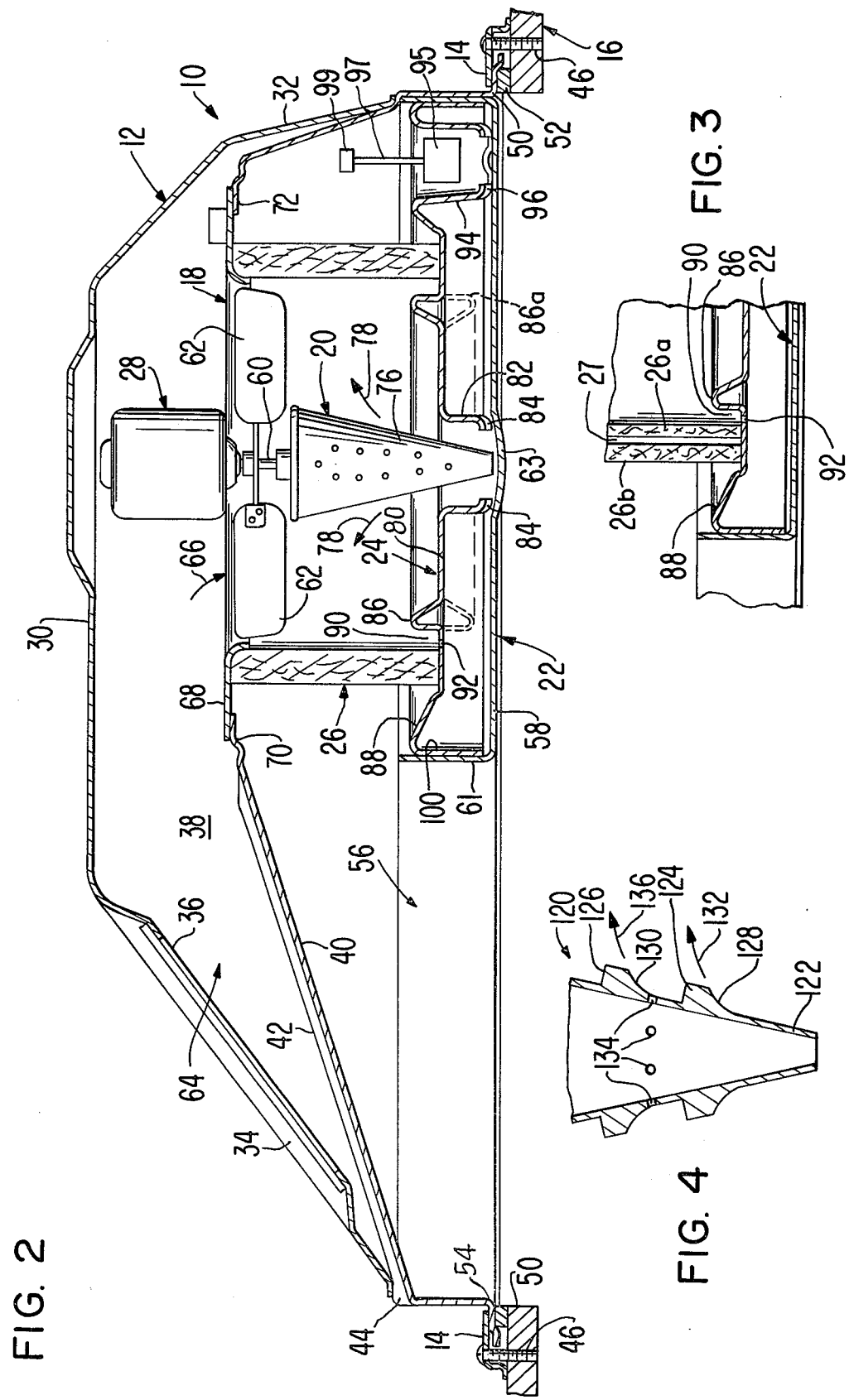

AIR COOLING APPARATUS

BACKGROUND OF THE INVENTION

Evaporative air coolers of the type used on the roof of a trailer include a housing having a fan for directing a flow of outside air into the trailer, and pump means for directing a water spray into the path of the incoming air before the air passes through a filter which strips the moisture from the air before the air enters the trailer. The air is cooled by evaporation upon contact with the water spray.

Conventional evaporative air coolers for use on trailers, campers and the like are generally placed on the roof of the trailer over a central opening in the roof. Such an air cooler includes a fan for drawing outside air into the trailer, pump means for spraying water into the path of the air to cool it by evaporation, and a filter for stripping excess moisture from the air before it enters the trailer. Typical air coolers are disclosed in U.S. Pat. Nos. 2,771,283 and 3,294,376.

In the latter patent, there is disclosed a baffle covering a water tank from which water is pumped by a conical, rotatable member into the path of the air. The baffle is used to prevent water in the tank from being splashed out of the same as the trailer moves from side-to-side or fore-to-aft such as by moving over rough roads and the like. The baffle has an upper surface sloping downwardly as a central opening in the baffle is approached so that water gravitating from the filter will move over such upper surface and return to the water tank through the central opening.

SUMMARY OF THE INVENTION

The present invention is directed to improvements in air coolers of the type described and includes an air cooler having an improved baffle for covering the water tank thereof to assure a more effective return of water to the water tank than is capable with prior baffles. To this end, the baffle includes rib means on its upper surface for defining a depression for receiving condensate from the margin of a tubular filter forming a part of the cooler. The depression has holes therethrough so that the condensate collected in the depression can return to the tank. In this way, the condensate need not move over the upper surface of the baffle to the central opening thereto to thereby assure a more positive return to the tank.

The baffle also has an improved central flange near the central opening thereof, the flange having means thereon for cooperating with the bottom of the tank to present metering holes by means of which water can enter the region below and aligned with the central opening in the baffle. In this way, water cannot splash out of the tank through the central opening due to water surges in the remaining part of the tank.

Another feature of the present invention is the provision of an improved housing for the cooler wherein the housing has an inclined surface below the air inlet opening thereof with the inclination of the surface being downwardly and away from the entrance end of the filter so that moisture entering the air inlet opening will gravitate onto the surface and then downwardly along the same away from such entrance end to thereby guard against accumulation of moisture in the housing when the invention is not in use.

Another feature of the invention is the provision of an improved filter assembly formed of a pair of filters of different porosities and used with the baffle of the type described. With such a filter assembly, the amount of water removed from the airflow can be more efficiently controlled as desired or deemed necessary.

The primary object of this invention is to provide an improved evaporative air cooler of the type having a baffle covering the water tank thereof wherein the baffle is provided with means defining a depression for receiving the condensate from a tubular filter so that the condensate will more effectively be returned to the water tank than is capable with baffles of conventional air coolers.

Another object of this invention is to provide a cooler of the type described wherein the baffle has flange means defining a central opening into which a conical, rotatable pump is to be positioned wherein the flange has water metering means thereon so that it will compensate for water surges in the tank to prevent splashing of water through the central opening.

Still another object of this invention is to provide a cooler of the aforesaid character wherein the cooler housing has a sloping surface below the air inlet opening thereof and extending downwardly and away from the air entrance end of the filter thereof so that moisture entering the air inlet opening will gravitate onto the surface and be directed away from such air entrance end, such as during periods of non-use or during a rainy period to avoid moisture accumulation in the housing.

Other objects of this invention will become apparent as the following specification progresses, reference being had to the accompanying drawings for an illustration of the invention.

In the drawings:

FIG. 2 is a cross-sectional view taken along line 2—2 of FIG. 1;

FIG. 3 is a fragmentary, cross-sectional view of the air cooler showing a modified filter assembly therefor; and FIG. 4 is a segmentary, enlarged, cross-sectional view of a modified form of a rotatable pump suitable for use with the air cooler.

Figure 1:
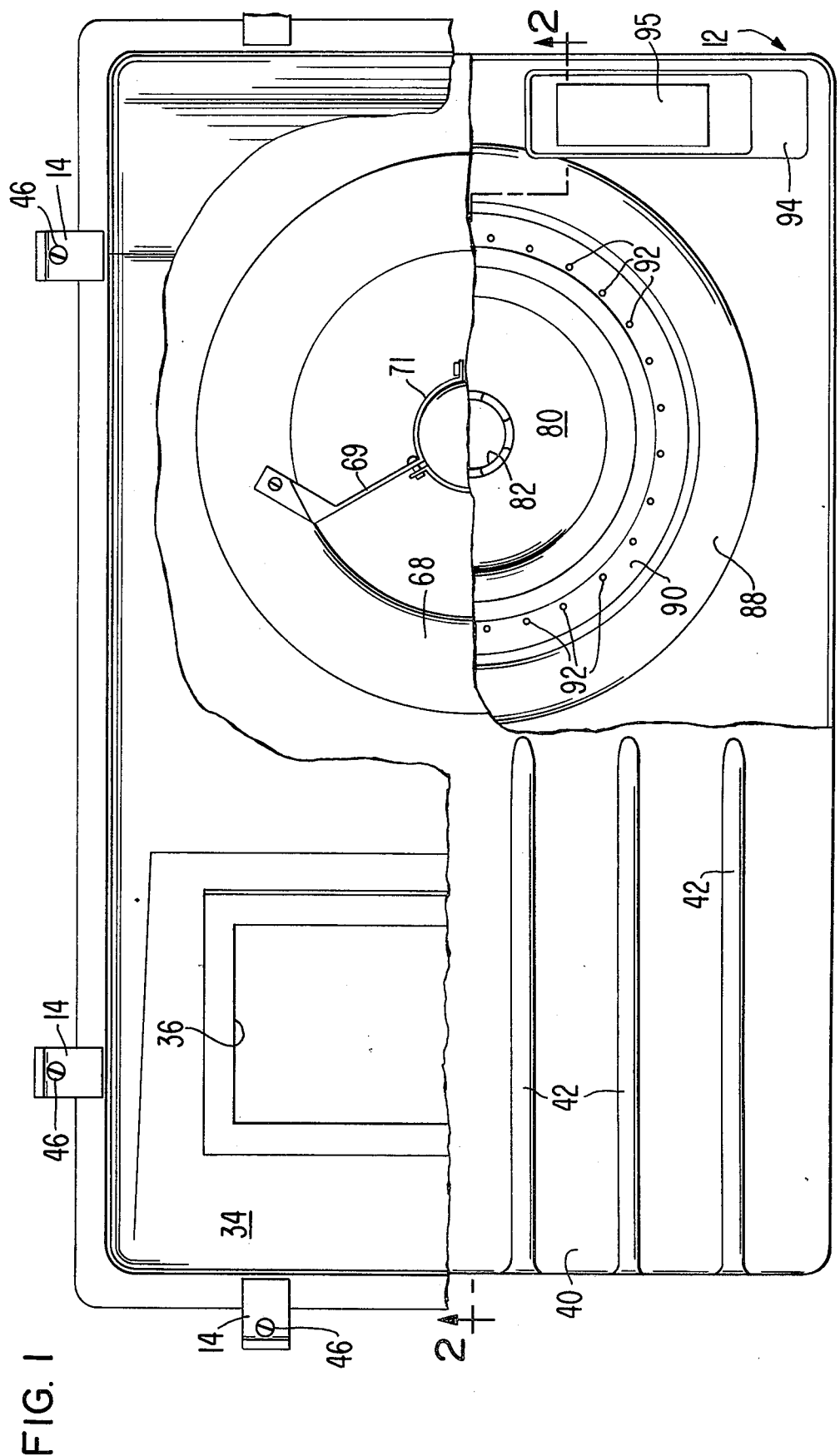
FIG. 1 is a top plan view, partly broken away, of the air cooler of this invention.

The evaporative air cooler of this invention is broadly denoted by the numeral 10 and includes a housing 12 which is adapted to be releasably secured by spaced fastener brackets 14 to the roof 16 of a vehicle, such as a trailer, whose interior is to be cooled. Cooler 10 further has a number of elements including a rotatable fan 18, a conical, rotatable pump 20, a water tank 22, an improved baffle 24 for covering tank 22, and a tubular filter 26 surrounding fan 18 and pump 20 and a motor 28 coupled with fan 18 and pump 20 for rotating the same. All of the foregoing elements are confined in housing 12 and are operable to cool air passing through the housing by evaporation.

Housing 12 has a top 30, a first, imperforate end wall 32 and a second end wall 34 provided with an air inlet opening 36. Wall 32 is normally the front wall of cooler 10; however, it could be at the rear of the cooler, if desired. The housing includes a pair of opposed sidewalls 38, only one of which is shown in FIG. 2. Generally, the side and end walls of housing 10 are inclined as shown in FIG. 2 to streamline the same to minimize drag due to wind resistance. Also, air inlet opening 36 may be provided with a grill for covering the same to provide a filtering effect.

Housing 12 is also provided with an inclined inner panel 40 spaced below and vertically aligned with air inlet opening 36. Panel 40 slopes downwardly and away from the main portion of the interior of the housing and has a number of spaced ribs 42 extending longitudinally thereof to strengthen the same. The inclination of panel 40 allows moisture, such as raindrops, to gravitate from air inlet opening 36 and onto the panel and to move downwardly therefrom to an exit 44 and onto the roof of the trailer. In this way, the moisture does not enter the working region of cooler 10 during periods of non-use, such as when the trailer is stationary.

Fasteners 14 are substantially L-shaped in cross section and are adapted to be secured by respective screws 46 to the trailer roof, specifically to structural members 48 forming parts of the roof. The housing has a generally continuous outer peripheral flange 50 which is adapted to bear against a continuous seal 52 engaging the roof of the trailer. Thus, brackets 14 effectively clamp the flange 50 to the trailer roof with the air outlet opening 54 of housing 12 in fluid communication with the opening in the roof. Thus, cooled air flowing out of housing 12 along the path denoted by arrow 56 will enter the trailer and cool the interior thereof.

Tank 22 has an open top, a flat bottom 58, and a generally continuous sidewall 61 extending upwardly from bottom 58, the latter having a shallow, central depression formed by a curved segment 63 which extends below the plane of the major portion of bottom 58. This depression is adapted to contain water when the water supply in the rest of the tank has been depleted. Thus, the lower end of pump 20 extending into the depression can provide a water pumping action even though the tank is essentially dry.

Motor 28 has a drive shaft 60 to which fan 18 and pump 20 are secured. Fan 18 has a number of blades 62 arranged to draw air into housing 12 through air inlet opening 36 along a path denoted by arrows 64 and 66. Fan 18 is located near the upper, air entrance end of filter 26, such air entrance end being defined by an annular plate 68 secured at a number of locations so that it is stationary within housing 12. For instance, plate 68 is secured to the upper end 70 of panel 40 and the upper end 72 of a second inclined panel 74 near end wall 32. Motor 28 is coupled by a number of circumferentially spaced braces 69 to annular plate 68. Only one brace 69 is shown in FIG. 1. A retainer ring carried by the braces is releasably secured to a collar on the motor housing.

Pump 20 includes a conical, perforate body 76 whose apex end extends into tank 22 and below the water level thereof. Body 76 operates, when rotating, to draw water upwardly and to project it laterally such as along paths denoted by arrows 78. The projected water collides with air particles in the airflow created by fan 18 and the air particles are cooled by evaporation before they pass into and through filter 26. The purpose of the filter is to strip excess water from the air particles before the latter pass out of housing 12 and into the trailer.

Baffle 24 has a generally horizontal upper surface 80 provided with a central opening into which body 76 extends. The baffle also has an annular flange 82 integral therewith and extending downwardly from the central opening, flange 82 having a lower margin provided with a number of spaced recesses 84 which cooperate with the upper surface of bottom 58 of tank 22 to provide metering holes to control surges of water in the cuplike region defined by and surrounded by flange 82. Thus, the water is prevented from splashing out of such region during side sway of the trailer.

Baffle 24 has a first, continuous projection or rib 86 integral therewith and projecting upwardly from upper surface 80 thereof. The baffle also has a second, continuous projection 88 spaced outwardly from projection 86 and forming therewith a continuous depression 90 between the projections and receiving the lower, continuous margin of filter 26.

Baffle 24 has one or more drain holes 92 therein in depression 90 so that condensate from the filter can return to tank 22. Preferably, a number of such drain holes will be located generally in the space between projection 86 and filter 26 as shown in FIG. 2. Thus, if there is an accumulation of water in the aforesaid space and if there is a sudden stop or start of the trailer, the water in the space has the full thickness of the filter to traverse before it splashes outwardly of the baffle and externally of the filter. Generally, it will not penetrate the full thickness of the filter.

While baffle 24 is shown as being formed with projection 86 extending upwardly, it could be formed so that such projection extends downwardly as shown by the dashed lines in FIG. 2. Thus, the interior of the projection, denoted by 86a, would provide a continuous depression having drain holes therein. Condensate from the filter would enter the depression by gravity and pass through the drain holes to tank 22. If projection 86a is used, it will serve as a partial barrier inside the water tank to dampen water surges therein because the projection, as it extends into the tank, effectively compartmentalizes the same.

Baffle 24 is also provided with a continuous flange 94 (FIG. 2) at one side thereof to contain a float 95 coupled by a link 97 to a valve 99 spaced above baffle 24 adjacent to panel 74 as shown in FIG. 2. Valve 99 is adapted to be coupled to a conduit leading through housing 12 to a source of water (not shown) under pressure, the outlet opening of the valve being arranged so that water issuing therefrom will be directed into the region defined by flange 94. Float 95 operates to sense the need for water in such region, flange 94 being constructed so that it has recesses 96 at its lower margin cooperable with the upper surface of bottom 58 of tank 22 to define metering holes as is described above with respect to recesses 84. Thus, flange 94 protects against water surges in the tank. The fact that the outlet of valve 99 is spaced above the water level in the region defined by flange 94 assures that there will be no backflow due to a siphoning action into the water source. Thus, such source will not be contaminated if there is such backflow.

An alternate form of filter is shown in FIG. 3 wherein, instead of a single filter, a pair of tubular filters 26a and 26b are provided. Filter 26a has a porosity greater than filter 26b and is spaced therefrom to present a water trap 27 therebetween. The filter assembly of FIG. 3, therefore, provides a greater water stripping action as the air particles move toward air outlet opening 54. The two filters could be contiguous with each other so that no space 27 is provided. In either case, the filters have lower continuous margins which extend into depression 90 and rest upon baffle 24, the latter having drain holes immediately below the filters to assure immediate return of condensate to tank 22.

In operation, air cooler 10 is mounted on the roof of the trailer by brackets 14. Such brackets allow a quick release means for the cooler and allow the cooler to be removed from the trailer, if desired. It is only necessary to cover the hole in the roof if the trailer is to be used without the cooler. The brackets can be either removed or remain attached to the roof by screws 46.

During movement of the trailer, motor 28 is actuated after water tank 22 has been filled to a predetermined level. The operation of the motor causes fan 18 to draw air into housing 12 and to follow the path denoted by arrows 64 and 66. Also, pump 22 is actuated by motor 28 and projects water into the airflow, causing the air particles to be cooled by evaporation. The moistened air then passes through the filter 26 and out of housing 12 along path 56 through outlet opening 54. Water condensing in filter 26 gravitates to baffle 24 and passes through holes 92 for return to water tank 22.

During operation of cooler 10, valve 97 assures that the water level in tank 22 is maintained. Moreover, the recesses 84 and 96 in flanges 84 and 94 assure that water does not splash out of the tank during side sway or abrupt starting or stopping of the trailer.

Baffle 24 is of one-piece construction. Preferably, it is of a molded plastic material and is provided with a continuous outer flange 100 for press-fitted attachment to sidewall 61.

A modified pump adapted to be used in place of group 20 is illustrated in FIG. 4 and is denoted by the numeral 120. It includes a generally conical, tubular body 122 having an open bottom and a pair of axially spaced, annular bosses 124 and 126 integral therewith, the lower boundary of boss 124 being defined by a transversely curved surface 128 and a lower boundary of boss 126 being defined by a transversely curved surface 130. Since body 122 is tubular, water can rise along the inner and outer surfaces thereof as the body rotates about its central axis. The water rising along the outer surface is caused to move along surface 128 and to be projected outwardly therefrom by centrifugal force in the direction of arrow 132. Similarly, water flowing upwardly along the inner surface of body 122 enters one or more access holes 134 and then engages and flows along surface 130 and is projected outwardly therefrom in the direction of arrow 136. In this way, the direction of the projection of the water toward the airflow can be more effectively controlled since surfaces 128 and 130 actually determine such direction and locate the position along body 122 at which the projection of the water occurs. For pump 20 (FIG. 2), the diameter change of body 76 is substantially linear with the change in its length. For pump 120, the diameter change of body 122 at each of bosses 124 and 126 is not linear with the change in its length.

I claim:

1. An evaporative air cooler comprising: a housing having an inclined end wall provided with an air inlet and an air outlet therethrough, and a panel in the housing and provided with an inclined surface spaced below and aligned with said air inlet and above and aligned with said air outlet, there being an exit opening between the lower margins of the end wall and said panel and spaced above said air outlet, said inclined surface sloping downwardly and away from the central interior of the housing to permit moisture entering the air opening to strike said inclined surface and to flow downwardly along the same toward and through said exit opening; a rotatable fan mounted in the housing near the upper end of the panel and disposed for creating a flow of air along a path through the housing from the air inlet to the air outlet; a motor within the housing above and coupled with the fan for rotating the same; an open top, relatively shallow water tank disposed in said housing adjacent to said air outlet and spaced below the fan; a baffle covering the open top of the tank, said baffle having an upper surface, a pair of spaced openings through said upper surface, and a pair of radially spaced, continuous projections defining an annular depression in surrounding, spaced relationship of one of the openings, the other opening being outboard of the outer projection, said baffle having a first flange integral therewith and extending downwardly therefrom in alignment with said one opening and into said tank, whereby the first flange forms with the bottom of the tank a first water-receiving cup, and a second flange integral with the baffle and extending downwardly therefrom in alignment with said other opening and into said tank, whereby the second flange forms with the bottom of the tank a second water-receiving cup, each flange having a lower margin provided with a recess therein which cooperates with the bottom of the tank to define a metering hole near the lower extremity of the corresponding cup; a conical, perforate pumping device having an upper enlarged end coupled with the motor and a lower apex end extending through said one opening and into the tank, said device being operable for pumping water upwardly from the tank and through the perforations of the device when the motor is actuated and as the fan directs a flow of air from said air inlet to said air outlet, whereby the air will be cooled by evaporation upon contact with the water elevated by said device; a valve above the baffle and having a float in the other opening, said valve adapted to be coupled to a source of water; and a filter extending upwardly from said baffle to a region adjacent to the top of said panel, said filter having a lower margin in the depression, the baffle having at least one drain hole therethrough in said depression.

2. An evaporative air cooler as set forth in claim 1, wherein said filter includes a pair of spaced, concentric filter units, a first of said filters having a porosity different from the second filter.

3. An evaporative air cooler as set forth in claim 1, wherein said device includes a transversely curved, annular surface intermediate the ends of the device, merging with the conical outer surface thereof, and extending upwardly and outwardly therefrom remote from the apex end thereof.

* * * * *